United States Patent Office 3,553,542
Patented Jan. 5, 1971

3,553,542
CAPACITOR DISCONNECT DEVICE
Paul H. Netherwood, Williamstown, Mass., assignor to Sprague Electric Company, North Adams, Mass., a corporation of Massachusetts
Filed Aug. 21, 1969, Ser. No. 851,823
Int. Cl. H01g 1/11
U.S. Cl. 317—247                                 4 Claims

ABSTRACT OF THE DISCLOSURE

A capacitor disconnect device in which a plactic cover for the capacitor casing has a entral part joined by flexible portions or hinges to the rest of the over and which is expandably distorted and causes an open in the current flow of the capacitor upon an unsafe accumulation of pressure within the capacitor housing.

BACKGROUND OF THE INVENTION

This invention relates to electrical capacitors which are subject to bursting, and more particularly to disconnect means for preventing such bursting.

The reasons for the build-up of internal gas pressure in a capacitor, such as a partial short circuit of the capacitor electrodes or an arc produced therebetween by the application of excess voltage, are well known to those skilled in the art. They have the final effect of creating a partial short circuit condition within the capacitor which leads to an abnormal heating of the capacitor fluid and a resultant rise in internal pressure which, unless relieved, will lead to a bursting of the capacitor, usually between the casing and the casing cover. The dangers of this bursting are also well known to those skilled in the art and need not be elaborated upon.

The prior art in this area has generally dealt with "can type" capacitors in which the casings were made of metal, hermetically sealed. The expansion, bulging or doming of the entire capacitor cover served as the disconnect device. In dealing with a plastic casing and cover, this prior art has proved inadequate.

Plastic cases are very weak and flexible, such that any disconnect device must be even more flexible than the case itself. If, however, the disconnect is very weak and is directly attached to the terminals, the disconnect will be operated by manipulating the terminals in the act of test or assembly. The terminals must be arranged in such a manner that a pullor twist will not activate the disconnect. The present invention does this by mounting the terminals on a rigid and sturdy part of the cover structure, and allows the disconnect to act independently of the terminals and at a very low pressure.

It is an object of this invention to eliminate the dangers attendant upon a bursting electrical capacitor.

It is also an object of this invention to provide electrical capacitors having a protective circuit breaker mechanism whereby protection is afforded against danger of excess build-up of internal pressure within capacitor housing.

It is a particular object of this invention to provide a circuit breaker mechanism for electrical capacitors having their entire casing and cover made of plastic material.

SUMMARY OF THE INVENTION

Broadly speaking, an electric capacitor in accordance with this invention comprises a sealed housing of plastic material, the center portion of the cover being joined to the rest of the cover by flexible plastic hinges enabling it to move outward with the accumulation of more than a normal amount of internal pressure. Within the housing there is the capacitor unit having two terminal electrode tabs. One is directly connected to a terminal on the outer portion of the cover. The other is fixed to a stud embedded in the cover's center expandable portion. A separate terminal tab connects this center stud to the other external terminal mounted on the opposite side of the cover. The connection between the center stud and the terminal tab from the capacitor unit also serves to support a bridge member of insulating material that is wider than the movable center portion of the cover and extends beyond the two terminals. The center stud contacts the terminal tab through an opening in this bridge member. Accumulated gas pressure causes the cover's center portion to move outward, but the bridge member is restrained by the more rigid outer portion of the cover. The connection between the stud and the terminal tab is ruptured as increased pressure carries the stud outward with the center portion while the tab is restrained by the bridge member. The circuit is thus opened and a further accumulation of pressure prevented so that the capacitor housing does not burst.

DESCRIPTION OF THE PREFERRED EMBODIMENTS

Figure 1:
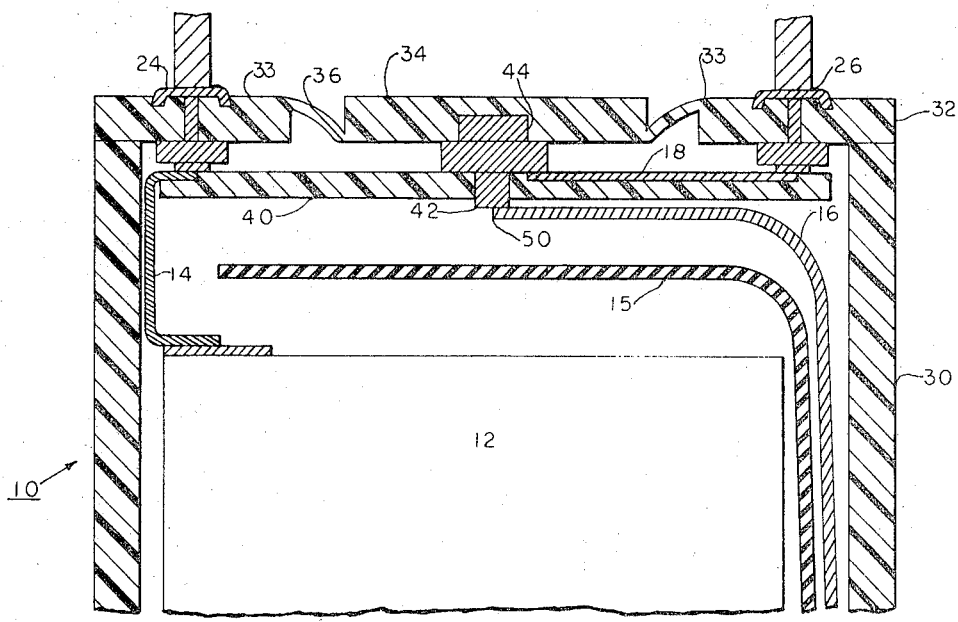
FIG. 1 is a part side-view of an electrical capacitor made in accordance with the present invention.
Figure 3:
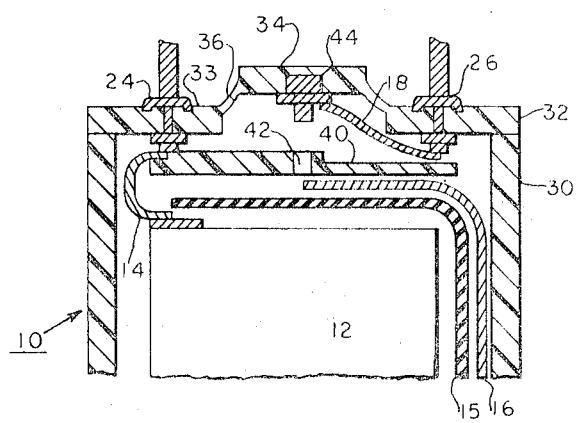
FIG. 3 is a part side-view of the capacitor of FIG. 1 after being subjected to internal pressure.

FIG. 1 illustrates an electric capacitor 10 comprising a sealed plastic housing having a plastic casing 30 and a plastic cover 32 and containing a capacitor section 12 having two terminal tabs 14 and 16 connecting separate electrodes to their respective terminals 24 and 26 on the rigid outer portion 33 of the capacitor cover 32. The capacitor cover 32 also has an outwardly movable center section 34 that is connected by flexible hinges 36 to its rigid outer portion 33. A metal stud member 44 is embedded in the movable center portion 34. One of the terminal tabs 14 is directly connected to its respective terminal 24. The other terminal tab 16 and metal stud 44 have a mechanical connection 50 made between them. Metal stud 44 is electrically connected by tab 18 to its respective terminal 26. Mechanical connection 50 between tab 16 and stud 44 also serves as a support for insulating bridge member 40 which is wider than center portion 34 and which extends beyond the terminals 24 and 26. Bridge member 40 is preferably planar as shown in FIG. 1, but may also have cutouts for conducting tabs as illustrated in FIG. 3. Metal stud 44 makes mechanical connection 50 to tab 16 through hole 42 in bridge member 40. Paper insulator 15 keeps tabs 14 and 16 from contacting each other, thus preventing an internal short circuit.

For illustrative purposes the capacitor section 12 shown is of paper foil, but it could also be a metallized section or even an electrolytic one. Terminal tabs 14 and 16 are made of aluminum or tinned copper or tin lead alloy, while plastic casing 30 and cover 32 are of polypropylene and bridge member 40 is phenolic, an insulating material.

Figure 2:
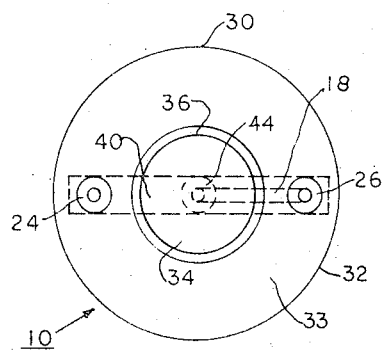
FIG. 2 is a top plan view of an electrical capacitor made in accordance with the present invention.

FIG. 2 shows an upper view of the capacitor cover 32 with its rigid outer portion 33 joined by flexible hinges 36 to the outwardly movable center portion 34. The two terminals 24 and 26 are shown mounted on the rigid outer portion 33. The dotted circles and lines outline structures beneath the capacitor cover 32. Metal stud 44 is embedded in center portion 34 and extends through bridge member 40 in hole 42 to make mechanical connection 50 with tab 16. Mechanical connection 50 also serves as a support for bridge member 40 which extends beyond terminals 24 and 26. Tab 18 makes the electrical connection between metal stud 44 and terminal 26.

FIG. 3 is an illustration of FIG. 1 at the moment the disconnect device is operated by the build-up of internal pressure. The build-up of internal pressure has caused the center section 34 of the capacitor cover 32 to move outward on its flexible hinges 36 away from rigid outer portion 33. Stud 44 also moves outward with center portion 34 because it is embedded therein. Tab 14 attached to terminal 24 is not affected by this movement. Tab 16 being mechanically connected with 50 to stud 44 moves outward also, as does bridge member 40 which is supported by mechanical connection 50. Bridge member 40 is restrained from much outward movement by rigid outer portion 33 which it contacts. As center portion 34 continues to move outward under build-up of internal gas pressure, it carries with it stud 44 and mechanical connection 50 is ruptured when restraining bridge member 40 prevents tab 16 from following stud 44 through hole 42 in bridge member 40. An open in the circuit is created and further generation of internal gas pressure stopped and the bursting of capacitor 10 prevented.

Since it is obvious that many changes and modifications can be made in the above-described details without departing from the nature and spirit of the invention it is to be understood that the invention is not limited to said details except as set forth in the appended claims.

What is claimed is:

1. A sealed electrical capacitor comprising a capacitor section in a casing having a cover, said cover having a rigid outer portion and a center portion outwardly movable under build-up of internal pressure, said movable center portion being hingedly joined to said rigid outer portion terminals being mounted on said rigid outer portion; a pair of conductive tabs being affixed to separate electrodes in said capacitor section; one of said tabs being directly connected to one of said terminals, the other of said tabs being mechanically connected to said center portion and electrically connected to another of said terminals; a rigid bridge member of insulating material being wider than said center portion, said bridge member extending across the underside of said cover, such that when internal pressure build-up causes said center portion to move outward, said mechanical connection is ruptured and an open caused by said bridge member, thus preventing further generation of internal gas pressure.

2. A sealed electrical capacitor in accordance with claim 1 wherein the entire capacitor housing and cover are made of plastic materials.

3. A sealed electrical capacitor in accordance with claim 2 wherein a metal stud member is embedded in said center portion and is in said electrical connection to another of said terminals.

4. A sealed electrical capacitor in accordance with claim 3 wherein said metal stud extends through said bridge member and makes said mechanical connection to the other of said tabs; said mechanical connection also serving as supporting medium of said bridge member.

References Cited

UNITED STATES PATENTS 3,377,510   4/1968   Rayno _____ 317—256X

E. A. GOLDBERG, Primary Examiner

U.S. Cl. X.R.

317—12, 256